US012618779B2

(12) United States Patent
Lee et al.

(10) Patent No.: US 12,618,779 B2
(45) Date of Patent: May 5, 2026

(54) FLUORESCENT ELLMAN ASSAY FOR FREE THIOL DETECTION

(71) Applicant: GENENTECH, INC., South San Francisco, CA (US)

(72) Inventors: Aron Lee, South San Francisco, CA (US); Rashmi Sharma, South San Francisco, CA (US); Justin Joo-Ho Jeong, South San Francisco, CA (US); Michael Tae-Jong Kim, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 470 days.

(21) Appl. No.: 18/140,891

(22) Filed: Apr. 28, 2023

(65) Prior Publication Data

US 2023/0408416 A1 Dec. 21, 2023

Related U.S. Application Data

(63) Continuation of application No. PCT/US2021/056978, filed on Oct. 28, 2021.

(Continued)

(51) Int. Cl.

| | |
|---|---|
| ***B01L 7/00*** | (2006.01) |
| ***B01D 15/08*** | (2006.01) |
| ***B01F 33/302*** | (2022.01) |
| ***B01F 33/3033*** | (2022.01) |
| ***B01J 20/285*** | (2006.01) |
| ***B01J 20/287*** | (2006.01) |
| ***B01J 20/32*** | (2006.01) |
| ***B01L 3/00*** | (2006.01) |
| ***B01L 9/00*** | (2006.01) |

(Continued)

(52) U.S. Cl.

CPC ..... *G01N 21/77* (2013.01); *G01N 2021/7786* (2013.01)

(58) Field of Classification Search

None

See application file for complete search history.

(56) References Cited

U.S. PATENT DOCUMENTS

| | | | | |
|---|---|---|---|---|
| 2009/0311142 | A1* | 12/2009 | Burgess-Cassler | G01N 33/6815 422/400 |
| 2011/0111446 | A1* | 5/2011 | Abe | C07D 493/10 436/103 |
| 2019/0293641 | A1 | 9/2019 | Mann et al. | |

FOREIGN PATENT DOCUMENTS

| | | |
|---|---|---|
| CN | 105601658 A | 5/2016 |
| JP | 2015-516371 A | 6/2015 |
| JP | 2019-526792 A | 9/2019 |

OTHER PUBLICATIONS

Aitken, et al., "Estimation of Disulfide Bonds Using Ellman's Reagent", in the Protein Protocols Handbook, 2nd Edition, J. M. Walker, Humana Press Inc., Totowa, New Jersey, pp. 595-596 (2002).

(Continued)

*Primary Examiner* — Jennifer Wecker
*Assistant Examiner* — Oyeleye Alexander Alabi
(74) *Attorney, Agent, or Firm* — Genentech, Inc.

(57) ABSTRACT

The present disclosure relates to methods and kits for detecting a free thiol in a substrate as well as methods for quantifying the amount of free thiol in a substrate. In particular, the present disclosure provides a fluorescent Ellman assay for enhanced sensitivity of free thiol detection and quantification.

20 Claims, 11 Drawing Sheets

Related U.S. Application Data

(60) Provisional application No. 63/106,569, filed on Oct. 28, 2020.

(51) Int. Cl.

| | |
|---|---|
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2006.01) |
| ***C12N 1/20*** | (2006.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/686*** | (2018.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/29*** | (2006.01) |
| ***G01N 21/33*** | (2006.01) |
| ***G01N 21/65*** | (2006.01) |
| ***G01N 21/77*** | (2006.01) |
| ***G01N 30/02*** | (2006.01) |
| ***G01N 30/60*** | (2006.01) |
| ***G01N 30/72*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/58*** | (2006.01) |
| ***G01N 33/68*** | (2006.01) |
| ***G01N 35/00*** | (2006.01) |
| ***H05B 45/10*** | (2020.01) |

(56) References Cited

OTHER PUBLICATIONS

Bouffard, et al., "A Highly Selective Fluorescent Probe for Thiol Bioimaging", Organic Letters, 10(1):37-40 (2008).
Chen, et al., "Fluorescent and colorimetric probes for detection of thiols", Chem. Soc. Rev., 39:2120-2135 (2010).
Daly, et al., "Current Developments in Fluorescent PET (Photoinduced Electron Transfer) Sensors and Switches", Chemical Society Reviews, 44(13):4203-4211 (2015).
Escudero, "Revising Intramolecular Photoinduced Electron Transfer (PET) from First-Principles," Acc. Chem. Res., 49(9):1816-1824 (2016).
Hawkins, et al., "Quantification of protein modification by oxidants", Free Radical Biology & Medicine, vol. 46, pp. 965-988 (2009).
Hoff, et al., "Quantification of protein thiols using ThioGlo 1 fluorescent derivatives and HPLC separation†", Analyst, 138:2096-2103 (2013).
Huang, et al., "Fluorescence biosensor based on silicon quantum dots and 5,5'-dithiobis- (2-nitrobenzoic acid) for thiols in living cells", Spectrochimica Acta Part A: Molecular and Biomolecular spectroscopy, vol. 229, (2019).
International Search Report mailed Jan. 28, 2022, in International Application No. PCT/US2021/056978.
Jiang et al., "A Highly Selective Fluorescent Probe for Thiophenols," Angew. Chem Int. Ed. 46:8445-8448 (2007).
Khan, et al., "A comprehensive review on carbon dots and graphene quantum dots based fluorescent sensor for biothiols", Microchemical Journal, vol. 157, pp. 1-12 (2020).
Lin et al., "A Highly Sensitive Fluorescent Probe for Detection of Benzenethiols in Environmental Samples and Living Cells," Chemical Communications, Issue 9, 14 pgs. (2010).
Pitzer, "Thermodynamics of Electrolytes. I. Theoretical Basis and General Equations", The Journal of Physical Chemistry, 77(2):268-277 (1973).
Riddles et al., "Reassessment of Ellman's Reagent," Methods Enzymol. 91:49-60 (1983).
Riener, et al., "Quick measurement of protein sulfhydryls with Ellman's reagent and with 4,4'-dithiodipyridine", Anal. Bioanal. Chem., 373(4-5):266-276 (2002).
Robotham, et al., "Detection and quantification of free sulfhydryls in monoclonal antibodies using maleimide labeling and mass spectrometry", MABS, 11(4):757-766 (2019).
Scatchard, "Concentrated Solutions of Strong Electrolytes", Chemical Reviews, 19(3):309-327 (1936).
Wang, et al., "Reaction-Based Fluorescent Probe for Selective Discrimination of Thiophenols over Aliphaticthiols and Its Application in Water Samples", Anal. Chem. 84:4915-4920 (2012).
Wei et al., "Development of a Rapid Reversed-Phase Liquid Chromatographic Method for Total Free Thiol Quantitation in Protein Therapeutics", J. Pharm. Biomed. Anal., 189:113434 (2020) 7 pgs.
Wright, et al., "Evaluation of Methods for the Quantitation of Cysteines in Proteins", Analytical Biochemistry, 265(1):8-14 (1998).
Yang et al., "ChemInform Abstract: Synthesis and Properties of a Maleimide Fluorescent Thiol Reagent Derived from a Naphthopyranone," Journal of Heterocyclic Chemistry 28(5):1177-1180 (1991).
Yang et al., "A high performance N-doped carbon quantum dots/5,5'-dithiobis- (2-nitrobenzoic acid) fluorescent sensor for biothiols detection," Sensors and Actuators B: Chemical, 255:3179-3186 (2018).

* cited by examiner

FLUORESCENT ELLMAN ASSAY FOR FREE THIOL DETECTION

CROSS-REFERENCE TO RELATED APPLICATIONS

This application is a continuation of International Patent Application No. PCT/US2021/056978, filed Oct. 28, 2021, which claims priority to U.S. Provisional Application No. 63/106,569 filed Oct. 28, 2020, the contents of each of which are incorporated by reference in their entireties, and to each of which priority is claimed.

FIELD OF INVENTION

The present disclosure relates to method for detecting a thiol. In particular, the present disclosure provides augmenting traditional Ellman's method to fluorescent Ellman's for enhanced sensitivity of free thiol detection.

BACKGROUND

Levels of low molecular weight thiols such as cysteine, homocysteine, and glutathione, are often critical for redox signaling and maintaining redox homeostasis. Imbalances of these thiols—homocysteine in particular—have been implicated in diseases such as cancer Alzheimer's, and cardiovascular disease. Signs of oxidative stress and aging can also manifest in distorted distributions between free thiols and other thiol forms (cysteinylation, glutathionylation, sulfeinic acid, etc.) on low molecular weight thiol substrates as well as on proteins such as human serum albumin. Quantitation methods for free thiols, or reactive sulfhydryls, are key analytical tools to study biology and medicine. Free thiol quantitation methods are useful in high throughput screening for new inhibitors of acetyltransferases, which are an important class of enzymes involved in major metabolic pathways and epigenetic regulation. Free thiol quantitation methods have also been applied in monitoring protein product quality in biopharmaceutical industry, where free thiols are sometimes engineered into proteins to produce bioconjugates for therapeutic or diagnostic purposes, or where they inadvertently appear as undesired post-translational modifications and are treated as potential critical quality attributes.

Among the available quantitation methods, optical sensing methods for free thiol are used and a large family of optical probes for thiol sensing have been developed. However, a common drawback to fluorogenic probes for thiol sensing is that their sensitivities can depend on the thiol substrate. As a result, fluorogenic probes for thiol sensing usually require either calibration using standards that are identical to the substrates in the test articles or determination of appropriate response factors. Additional drawbacks to fluorogenic probes are that they can be sterically bulky and often have limited solubility in water. On the other hand, Ellman's reagent, or 5,5'-dithiobis-(2-nitrobenzoic acid) (DTNB), the classic optical probe for free thiol sensing, happens to be highly water soluble, is not bulky, and its sensitivity is agnostic to the thiol substrate. The main disadvantage of the Ellman's method is that the quantitation limits are significantly higher (3-4 orders of magnitude) than most fluorogenic methods for free thiol quantitation. This can mean that large quantities of sample are required (e.g. milligrams of a therapeutic antibody) in order to obtain a quantitative free thiol measurement, which is impractical and sometimes prohibitively expensive.

SUMMARY OF THE INVENTION

In certain embodiments, the present disclosure is directed to methods for detecting a free thiol comprising: a) contacting a thiol substrate with 5,5'-dithiobis-(2-nitrobenzoic acid) (DTNB) to stoichiometrically liberate $TNB^{2-}$; b) contacting the liberated $TNB^{2-}$ with a reagent that interacts with the liberated $TNB^{2-}$ to produce a fluorescent signal; and c) detecting the fluorescent signal emitted by the interaction of the liberated $TNB^{2-}$ with the reagent to thereby detect the free thiol. In certain embodiments, the reagent employed in the context of the method is a fluorogenic probe. In certain embodiments, the reagent employed in the context of the method is a fluorescent probe. In certain embodiments, incubating the $TNB^{2-}$ molecules with the fluorogenic or the fluorescent probe results in formation of a fluorescent TNB-probe adduct or a deprotected fluorescent probe and a non-fluorescent TNB adduct. In certain embodiments, the fluorescent signal is emitted by the fluorescent TNB-probe adduct. In certain embodiments, the fluorescent signal is emitted by the deprotected fluorescent probe. In certain embodiments, the fluorogenic or fluorescent probe is a thiol-specific probe. In certain embodiments, the thiol-specific probe contains a maleimide functional group. In certain embodiments, the thiol-specific probe contains a 2,4-dinitrobenzene sulfonamide (DNBS) function group. In certain embodiments, the fluorogenic probe is methyl maleimidobenzochromene-carboxylate (MMBC). In certain embodiments, the fluorogenic probe is ThioFluor 623.

In certain embodiments of the free thiol detection methods described herein, the thiol is present on a low molecular weight thiol substrate. In certain embodiments, the thiol is present on a high molecular weight thiol substrate. In certain embodiments, the high molecular weight thiol substrate is a polypeptide. In certain embodiments, the polypeptide is an antibody. In certain embodiments, the antibody is an IgG2. In certain embodiments, the antibody is one half of a bispecific antibody. In certain embodiments, the high molecular weight thiol substrate is an antibody-drug-conjugate (ADC).

In certain embodiments, the present disclosure is directed to methods for determining the free thiol content of a thiol substrate comprising: a) contacting the thiol substrate with 5,5'-dithiobis-(2-nitrobenzoic acid) (DTNB) to stoichiometrically liberate $TNB^{2-}$; b) incubating the $TNB^{2-}$ with a reagent that interacts with the liberated $TNB^{2-}$ to produce a fluorescent signal; c) detecting a fluorescent signal emitted by the interaction of the liberated $TNB^{2-}$ with the reagent, and d) quantifying the free thiol content of the molecule by comparing the signal detected in c) with a reference signal of known quantity.

In certain embodiments of the free thiol detection methods described herein, the reagent is a fluorogenic probe. In certain embodiments, the reagent is a fluorescent probe. In certain embodiments, the thiol is present on a high molecular weight thiol substrate. In certain embodiments, the high molecular weight thiol substrate is a polypeptide. In certain embodiments, the high molecular weight thiol substrate is an antibody-drug conjugate. In certain embodiments, the polypeptide is an antibody. In certain embodiments, the antibody is an IgG2. In certain embodiments, the antibody is one half of a bispecific antibody. In certain embodiments, the antibody is a bispecific antibody.

In certain embodiments of the free thiol detection methods described herein, incubation of $TNB^{2-}$ with the fluorogenic or fluorescent probe results in formation of a fluorescent TNB-probe adduct or a deprotected fluorescent probe and a non-fluorescent TNB adduct. In certain embodiments, the fluorescent signal is emitted by the fluorescent TNB-probe adduct. In certain embodiments, the fluorescent signal is emitted by the deprotected fluorescent probe. In certain embodiments, the fluorogenic or fluorescent probe is a thiol-specific probe. In certain embodiments, the thiol-specific probe contains a maleimide functional group. In certain embodiments, the thiol-specific probe contains a 2,4-dinitrobenzene sulfonamide (DNBS) function group. In certain embodiments, the fluorogenic probe is methyl maleimidobenzochromene-carboxylate (MMBC). In certain embodiments, the fluorogenic probe is ThioFluor 623.

In certain embodiments of the free thiol detection methods described herein, the free thiol content is calculated by comparing the fluorescence signal against a calibration curve to determine the thiol concentration and dividing the thiol concentration by the concentration of the thiol substrate.

In certain embodiments, the present disclosure relates to kits for the detection of a thiol compound, comprising: a) 5,5'-dithiobis-(2-nitrobenzoic acid) (DTNB); and b) a fluorogenic or fluorescent probe. In certain embodiments, the kits comprise thiol-containing standards for generating a calibration curve. In certain embodiments, the thiol-containing standards are selected from cysteine, glutathione and N-acetylated cysteine. In certain embodiments, the fluorogenic or fluorescent probe is a thiol-specific fluorogenic probe. In certain embodiments, the fluorogenic probe is methyl maleimidobenzochromene-carboxylate (MMBC). In certain embodiments, the thiol-specific fluorogenic or fluorescent probe contains a maleimide functional group. In certain embodiments, the thiol-specific fluorogenic or fluorescent probe contains a 2,4-dinitrobenzene sulfonamide (DNBS) function group. In certain embodiments, the fluorogenic probe is ThioFluor 623. In certain embodiments, the kits of the present disclosure comprise a denaturing buffer. In certain embodiments, the denaturing buffer is a hemisodium 3-(N-morpholino)propanesulfonic acid (MOPS) buffer containing guanidine hydrochloride.

BRIEF DESCRIPTION OF THE DRAWINGS

FIG. 3A depicts an emission spectrum with excitation wavelength fixed to 385 nm and FIG. 3B depicts an excitation spectrum with emission wavelength fixed to 510 nm.

FIG. 4A depicts a reversed phase chromatogram with 214 nm UV detection and FIG. 4B depicts a reversed phase chromatogram with 375 nm/510 nm fluorescence detection. Asterisked peaks denote impurities associated with the TNB or MMBC starting materials. FIG. 4C depicts a mass spectra of the earlier-eluting TNB-MMBC adduct peaks and FIG. 4D depicts a mass spectra of the later-eluting TNB-MMBC adduct peaks.

FIG. 6A depicts a curve under native conditions and FIG. 6B depicts a curve under denaturing conditions. Fluorescence readings were taken 30 minutes after introducing MMBC reagent. Substrate-agnostic linear regressions (trendlines) in both plots were based on all plotted data points.

DETAILED DESCRIPTION

Figure 1:
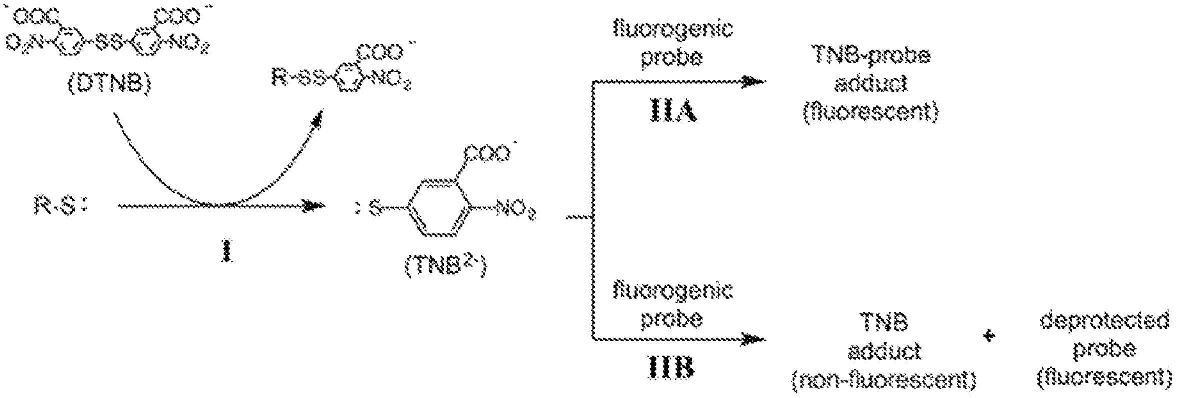
FIG. 1 depicts a schematic for the Fluorescent Ellman's ("F. Ellman") assay. Incubation of thiol substrates with DTNB (step I) stoichiometrically liberates $TNB^{2-}$ molecules, which are subsequently reacted with thiol-specific fluorogenic probes (step II) to yield a fluorescent signal. These fluorogenic reactions proceed either by forming a fluorescent TNB-probe adduct (IIA) or by yielding a deprotected fluorescent probe (IIB).

The following Detailed Description, given by way of example, but not intended to limit the presently disclosed subject matter to specific embodiments described, may be understood in conjunction with the accompanying drawings.

The presently disclosed subject matter provides a method for detecting a thiol comprising a) contacting a thiol substrate with 5,5'-dithiobis-(2-nitrobenzoic acid) (DTNB) to stoichiometrically liberate $TNB^{2-}$; b) contacting the liberated $TNB^{2-}$ with a reagent that interacts with the liberated $TNB^{2-}$ to produce a fluorescent signal and c) detecting a fluorescent signal emitted by the interaction of the liberated $TNB^{2-}$ with the reagent to thereby detect the thiol. The presently disclosed subject matter also provides a method of quantifying the free thiol content of a thiol substrate, the method comprising: a) contacting the thiol substrate with 5,5'-dithiobis-(2-nitrobenzoic acid) (DTNB) to stoichiometrically liberate $TNB^{2-}$; b) incubating the $TNB^{2-}$ with a reagent that interacts with the liberated $TNB^{2-}$ to produce a fluorescent signal; c) detecting a fluorescent signal emitted by the interaction of the liberated $TNB^{2-}$ with the reagent and d) quantifying the free thiol content of the molecule by comparing the signal detected in c) with a reference signal of known quantity. The presently disclosed subject matter also provides a kit for detecting a and compound, comprising: a) 5,5'-dithiobis-(2-introbenzoic acid) (DTNB); and b) a fluorogenic or fluorescent probe.

The presently disclosed subject matter is based, at least in part, on the discovery that by adding an incubation step with the fluorogenic probe methyl maleimidobenzochromene-carboxylate (MMBC) at the end of the Ellman's method effectively transduces the UV absorption signal into a fluorescent signal, and improves the quantitation limits of the Ellman's method by approximately 4-fold, even with a 2-fold dilution due to MMBC addition.

Non-limiting embodiments of the presently disclosed subject matter are described by the present specification and Examples.

1. Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a substantial difference over what is generally understood in the art.

The terms "comprise(s)," "include(s)," "having," "has," "can," "contain(s)," and variants thereof, as used herein, are intended to be open-ended transitional phrases, terms or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "polypeptide" refers generally to peptides and proteins having more than about ten amino acids. The polypeptides can be homologous to the host cell, or preferably, can be exogenous, meaning that they are heterologous, i.e., foreign, to the host cell being utilized, such as a human protein produced by a Chinese hamster ovary cell, or a yeast polypeptide produced by a mammalian cell. In certain embodiments, mammalian polypeptides (polypeptides that were originally derived from a mammalian organism) are used, more preferably those which are directly secreted into the medium.

The term "protein" is meant to refer to a sequence of amino acids for which the chain length is sufficient to produce the higher levels of tertiary and/or quaternary structure. This is to distinguish from "peptides" or other small molecular weight drugs that do not have such structure. Typically, the protein herein will have a molecular weight of at least about 15-20 kD, preferably at least about 20 kD. Examples of proteins encompassed within the definition herein include all mammalian proteins, in particular, therapeutic and diagnostic proteins, such as therapeutic and diagnostic antibodies, and, in general proteins that contain one or more disulfide bonds, including multi-chain polypeptides comprising one or more inter- and/or intrachain disulfide bonds.

The term "antibody" is used herein in the broadest sense and encompasses various antibody structures including, but not limited to, monoclonal antibodies, polyclonal antibodies, monospecific antibodies (e.g., antibodies consisting of a single heavy chain sequence and a single light chain sequence, including multimers of such pairings), multispecific antibodies (e.g., bispecific antibodies), and antibody fragments so long as they exhibit the desired antigen-binding activity.

2. Methods

The presently disclosed subject matter provides methods for detecting a thiol. In certain embodiments, the method comprises: a) contacting a thiol substrate with 5,5'-dithiobis-(2-nitrobenzoic acid) (DTNB) to stoichiometrically liberate $TNB^{2-}$; b) contacting the liberated $TNB^{2-}$ with a reagent that interacts with the liberated $TNB^{2-}$ to produce a fluorescent signal; and c) detecting a fluorescent signal emitted by the interaction of the liberated $TNB^{2-}$ with the reagent to thereby detect the thiol.

The presently disclosed subject matter also provides methods of quantifying the free thiol content of a thiol substrate, the method comprising: a) contacting the thiol substrate with 5,5'-dithiobis-(2-nitrobenzoic acid) (DTNB) to stoichiometrically liberate $TNB^{2-}$; b) incubating the $TNB^{2-}$ with a reagent that interacts with the liberated $TNB^{2-}$ to produce a fluorescent signal; c) detecting a fluorescent signal emitted by the interaction of the liberated $TNB^{2-}$ with the reagent; and d) quantifying the free thiol content of the molecule by comparing the signal detected in c) with a reference signal of known quantity.

In certain embodiments, the reagent is a fluorogenic probe. In certain embodiments, the reagent is a fluorescent probe. In certain embodiments, the incubation of $TNB^{2-}$ molecules with the fluorogenic or the fluorescent probe results in formation of: a) a fluorescent TNB-probe adduct; or b) a deprotected fluorescent probe and a non-fluorescent TNB adduct. In certain embodiments, the fluorescent signal is emitted by the fluorescent TNB-probe adduct. In certain embodiments, the fluorescent signal is emitted by the deprotected fluorescent probe. In certain embodiments, the fluorogenic or fluorescent probe is a thiol-specific probe. In certain embodiments, the thiol-specific probe contains a maleimide functional group. In certain embodiments, the thiol-specific probe contains a 2,4-dinitrobenzene sulfonamide (DNBS) function group. In certain embodiments, the fluorogenic probe is methyl maleimidobenzo-chromene-carboxylate (MMBC). In certain embodiments, the fluorogenic probe is ThioFluor 623. In certain embodiments, the thiol is present on a low molecular weight thiol substrate. In certain embodiments, the thiol is present on a high molecular weight thiol substrate. In certain embodiments, the high molecular weight thiol substrate is a polypeptide. In certain embodiments, wherein the polypeptide is an antibody. In certain embodiments, the antibody is an IgG2. In certain embodiments, the antibody is one half of a bispecific antibody. In certain embodiments, the high molecular weight thiol substrate is an antibody-drug-conjugate (ADC). In certain embodiments, the free thiol content is calculated by comparing the fluorescence signal against a calibration curve to determine the thiol concentration and dividing the thiol concentration by the concentration of the thiol substrate.

3. Kits

The presently disclosed subject matter provides kits for detecting a thiol compound. In certain embodiments, the kit comprises 5,5'-dithiobis-(2-nitrobenzoic acid) (DTNB) and a fluorogenic or fluorescent probe. In certain embodiments, the kit comprises a sterile container; such containers can be boxes, ampules, bottles, vials, tubes, bags, pouches, blister-packs, or other suitable container forms known in the art. Such containers can be made of plastic, glass, laminated paper, metal foil, or other materials suitable for holding medicaments. In certain embodiments, the kit comprises thiol-containing standards for generating a calibration curve. In certain embodiments, the thiol-containing standards are selected from cysteine, glutathione and N-acetylated cysteine. In certain embodiments, the fluorogenic or fluorescent probe is a thiol-specific fluorogenic probe. In certain embodiments, the fluorogenic probe is methyl maleimido-benzo-chromene-carboxylate (MMBC). In certain embodiments, the thiol-specific fluorogenic or fluorescent probe contains a maleimide functional group. In certain embodiments, the thiol-specific fluorogenic or fluorescent probe that contains a 2,4-dinitrobenzene sulfonamide (DNBS) function group. In certain embodiments, the fluorogenic probe is ThioFluor 623. In certain embodiments, the kit comprises a denaturing buffer. In certain embodiments, the denaturing buffer is a hemisodium 3-(N-morpholino)propanesulfonic acid (MOPS) buffer containing guanidine hydrochloride.

4. Exemplary Embodiments of the Disclosure

In certain embodiments, the present disclosure is directed to methods for detecting a free thiol comprising: a) contacting a thiol substrate with 5,5'-dithiobis-(2-nitrobenzoic acid) (DTNB) to stoichiometrically liberate $TNB^{2-}$; b) contacting the liberated $TNB^{2-}$ with a reagent that interacts with the liberated $TNB^{2-}$ to produce a fluorescent signal; and c) detecting the fluorescent signal emitted by the interaction of the liberated $TNB^{2-}$ with the reagent to thereby detect the free thiol. In certain embodiments, the reagent employed in the context of the method is a fluorogenic probe. In certain embodiments, the reagent employed in the context of the method is a fluorescent probe. In certain embodiments, incubating the $TNB^{2-}$ molecules with the fluorogenic or the fluorescent probe results in formation of a fluorescent TNB-probe adduct or a deprotected fluorescent probe and a non-fluorescent TNB adduct. In certain embodiments, the fluorescent signal is emitted by the fluorescent TNB-probe adduct. In certain embodiments, the fluorescent signal is emitted by the deprotected fluorescent probe. In certain embodiments, the fluorogenic or fluorescent probe is a thiol-specific probe. In certain embodiments, the thiol-specific probe contains a maleimide functional group. In certain embodiments, the thiol-specific probe contains a 2,4-dinitrobenzene sulfonamide (DNBS) function group. In certain embodiments, the fluorogenic probe is methyl maleimido-benzochromene-carboxylate (MMBC). In certain embodiments, the fluorogenic probe is ThioFluor 623.

In certain embodiments of the free thiol detection methods described herein, the thiol is present on a low molecular weight thiol substrate. In certain embodiments, the thiol is present on a high molecular weight thiol substrate. In certain embodiments, the high molecular weight thiol substrate is a polypeptide. In certain embodiments, the polypeptide is an antibody. In certain embodiments, the antibody is an IgG2. In certain embodiments, the antibody is one half of a bispecific antibody. In certain embodiments, the high molecular weight thiol substrate is an antibody-drug-conjugate (ADC).

In certain embodiments, the present disclosure is directed to methods for determining the free thiol content of a thiol substrate comprising: a) contacting the thiol substrate with 5,5'-dithiobis-(2-nitrobenzoic acid) (DTNB) to stoichiometrically liberate $TNB^{-2}$; b) incubating the $TNB^{2-}$ with a reagent that interacts with the liberated $TNB^{2-}$ to produce a fluorescent signal; c) detecting a fluorescent signal emitted by the interaction of the liberated $TNB^{2-}$ with the reagent, and d) quantifying the free thiol content of the molecule by comparing the signal detected in c) with a reference signal of known quantity.

In certain embodiments of the free thiol detection methods described herein, the reagent is a fluorogenic probe. In certain embodiments, the reagent is a fluorescent probe. In certain embodiments, the thiol is present on a high molecular weight thiol substrate. In certain embodiments, the high molecular weight thiol substrate is a polypeptide. In certain embodiments, the high molecular weight thiol substrate is an antibody-drug conjugate. In certain embodiments, the polypeptide is an antibody. In certain embodiments, the antibody is an IgG2. In certain embodiments, the antibody is one half of a bispecific antibody. In certain embodiments, the antibody is a bispecific antibody.

In certain embodiments of the free thiol detection methods described herein, incubation of $TNB^{2-}$ with the fluorogenic or fluorescent probe results in formation of a fluorescent TNB-probe adduct or a deprotected fluorescent probe and a non-fluorescent TNB adduct. In certain embodiments, the fluorescent signal is emitted by the fluorescent TNB-probe adduct. In certain embodiments, the fluorescent signal is emitted by the deprotected fluorescent probe. In certain embodiments, the fluorogenic or fluorescent probe is a thiol-specific probe. In certain embodiments, the thiol-specific probe contains a maleimide functional group. In certain embodiments, the thiol-specific probe contains a 2,4-dinitrobenzene sulfonamide (DNBS) function group. In certain embodiments, the fluorogenic probe is methyl maleimido-benzochromene-carboxylate (MMBC). In certain embodiments, the fluorogenic probe is ThioFluor 623.

In certain embodiments of the free thiol detection methods described herein, the free thiol content is calculated by comparing the fluorescence signal against a calibration curve to determine the thiol concentration and dividing the thiol concentration by the concentration of the thiol substrate.

In certain embodiments, the present disclosure relates to kits for the detection of a thiol compound, comprising: a) 5,5'-dithiobis-(2-nitrobenzoic acid) (DTNB); and b) a fluorogenic or fluorescent probe. In certain embodiments, the kits comprise thiol-containing standards for generating a calibration curve. In certain embodiments, the thiol-containing standards are selected from cysteine, glutathione and N-acetylated cysteine. In certain embodiments, the fluorogenic or fluorescent probe is a thiol-specific fluorogenic probe. In certain embodiments, the fluorogenic probe is methyl maleimidobenzochromene-carboxylate (MMBC). In certain embodiments, the thiol-specific fluorogenic or fluorescent probe contains a maleimide functional group. In certain embodiments, the thiol-specific fluorogenic or fluorescent probe contains a 2,4-dinitrobenzene sulfonamide (DNBS) function group. In certain embodiments, the fluorogenic probe is ThioFluor 623. In certain embodiments, the kits of the present disclosure comprise a denaturing buffer. In certain embodiments, the denaturing buffer is a hemisodium 3-(N-morpholino)propanesulfonic acid (MOPS) buffer.

EXAMPLES

Example 1: Materials and Methods

Materials

All antibodies and antibody-drug-conjugates (ADC) tested, were produced by Genentech (South San Francisco, CA). The two ADCs tested included one with drugs conjugated to reduced interchain disulfides (ADC-A) and another with drugs conjugated to engineered unpaired cysteines (ADC-B). DTNB, cysteine, glutathione, N-acetyl cysteine, dimethyl sulfoxide (DMSO), sodium phosphate, hemisodium 3-(N-morpholino)propanesulfonic acid (MOPS), and ethylenediaminetetraacetic acid (EDTA) were purchased from Sigma-Aldrich (St. Louis, MO). Guanidine hydrochloride was purchased from EMD Millipore (Burlington, MA). $TNB^{2-}$ was purchased from Biovision (Milpitas, CA). MMBC (methyl maleimidobenzochromene-carboxylate) was purchased from Combi-Blocks (San Diego, CA); 1 mM stocks of MMBC were prepared in DMSO and kept frozen at −20° C. until used. Working solutions of MMBC (20 μM) were prepared by diluting the 1 mM stocks with 100 mM sodium phosphate, pH 7.4. Other probes tested were purchased from vendors listed in Table 1. Other consumables and equipment used, include NBS 96-well half-volume black plates and 96-well half-volume clear bottom plates from include NBS 96-well half-volume black plates and 96-well half-volume clear bottom plates from Corning (Corning, NY), a Poroshell 120-C18 reversed phase column (2.7 μm particle diameter, 3.0×100 mm) and 1290 UHPLC from Agilent (Santa Clara, CA), a Nanodrop 2000 and a Fusion hybrid mass spectrometer from Thermo Scientific (Waltham, MA), a SpectraMax i3 plate reader (San Jose, CA), and a Mettler-Toledo InLab ultra-micro pH meter (Columbus, OH).

TABLE 1

List of fluorescent/fluorogenic probes tested

| Name | Vendor | Excitation/ Emission | Structure | Comments |
|---|---|---|---|---|
| Measure-iT Thiol Assay Kit | Life Technologies | 494/517 nm | Disulfide, exact structure unknown | No dose-dependent response to TNB |
| CPM | Life Technologies | 384/470 nm | 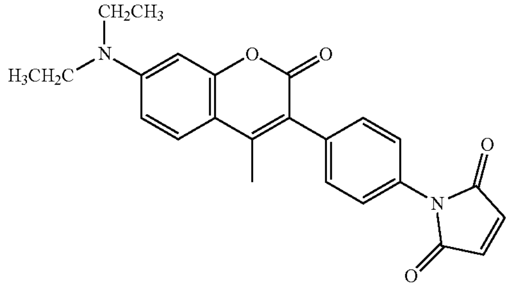 | No dose-dependent response to TNB |
| DCIA | Life Technologies | 384/470 nm | 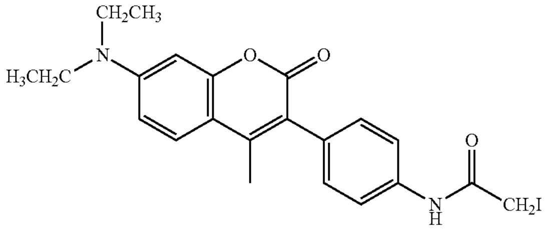 | No dose-dependent response to TNB |
| ThioGlo-3 | Covalent Associates | 378/446 nm | 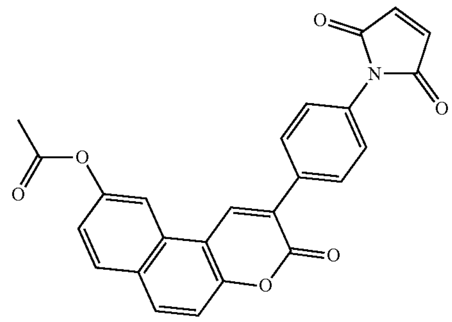 [SMILES: CC(=O)Oc1ccc2ccc3oc(=O)c(-c4ccc(N5C(=O)C=CC5=O)cc4)cc3c2c1] | No dose-dependent response to TNB |

TABLE 1-continued

| List of fluorescent/fluorogenic probes tested | | | | |
|---|---|---|---|---|
| Name | Vendor | Excitation/ Emission | Structure | Comments |
| Alexa Fluor 660 $C_2$ maleimide | Life Technologies | 668/697 nm | Fluorescent maleimide, exact structure unknown | Fluorescent, not fluorogenic. High noise. |
| ThioFluor 623 | Cayman Chemical | 563/623 nm | 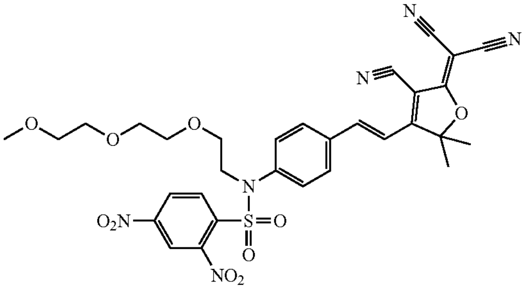 [SMILES: COCCOCCOCCN(c1ccc(/C=C/C2=C(C#N)C(=C(C#N)C#N)OC2(C)C)cc1)S(=O)(=O)c1ccc([N+](=O)[O-])cc1[N+](=O)[O-]] | Less sensitive than MMBC |
| MMBC (a.k.a. ThioGlo-1) | Combi-Blocks | 379/513 nm | 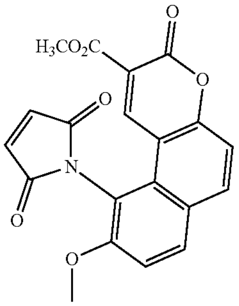 [SMILES: COC(=O)c1cc2c(ccc3ccc(OC)c(N4C(=O)C=CC4=O)c32)oc1=O] | Most sensitive |

Screening Fluorescent and Fluorogenic Probes

Seven fluorescent or fluorogenic probes (Table 1) including MMBC were evaluated for their ability to transduce $TNB^{2-}$ into a fluorescent signal (FIG. 1, step II). In brief, the probes were reacted according to their manufacturer's recommendations with various concentrations of $TNB^{2-}$ (ranging from 0-2 μM), which was prepared directly from $TNB^{2-}$ powder dissolved in water. Fluorescence was monitored over a period of 45 minutes, using the manufacturer's recommended excitation/emission wavelength pairs (Table 1).

Characterization of TNB-MMBC Adduct

Figure 3A:
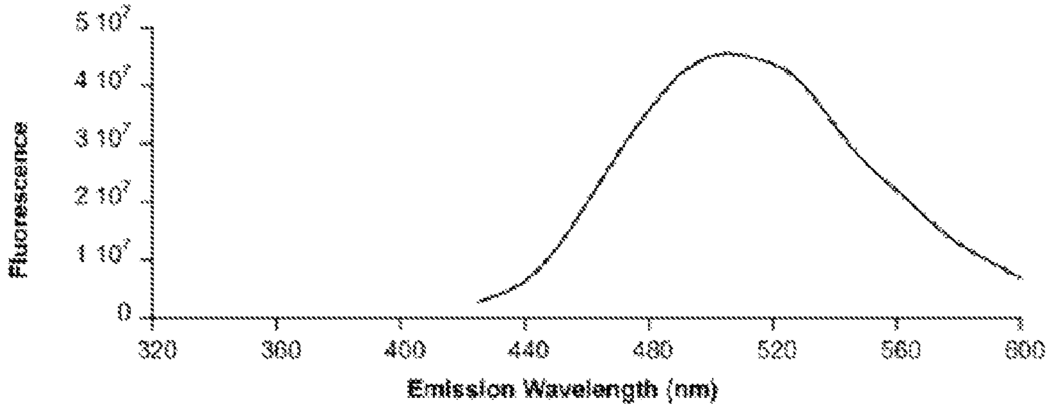
FIGS. 3A-3B depicts the emission and excitation spectrum of the fluorescent TNB-MMBC adduct.
Figure 3B:
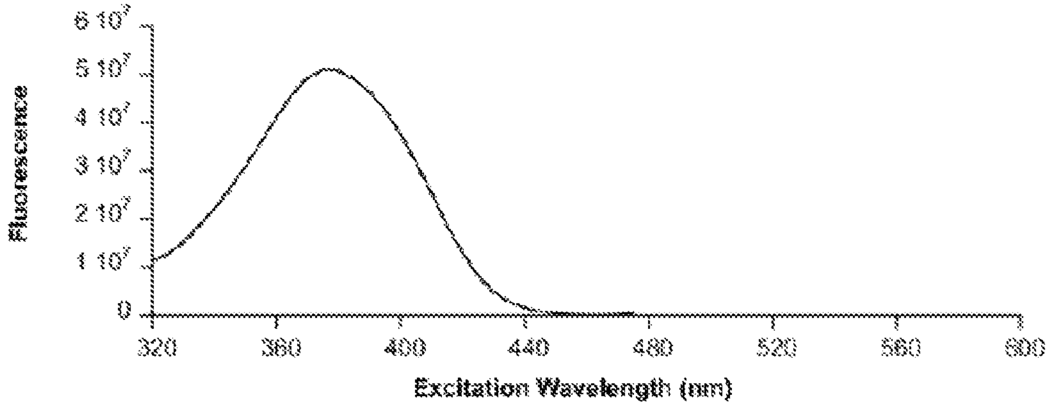

To verify the nature of the resulting TNB-MMBC adduct, the emission and excitation spectra for the TNB-MMBC adduct were determined. A 10 μM $TNB^{2-}$ standard was diluted 1:1 with a 20 μM MMBC solution and incubated in the dark at r.t. for 30 minutes before performing readings using a plate reader. A series of emission wavelengths from 425 to 600 nm were tested while fixing the excitation at the fluorescence probe manufacturer's recommended value of 385 nm (FIG. 3A). Maximal fluorescence intensity was achieved by monitoring emission at 510 nm, so then a series of excitation wavelengths from 325 to 475 nm were tested, this time fixing the emission at 510 nm (FIG. 3B). Maximal fluorescence intensity was achieved by exciting at 375 nm.

The structure of the TNB-MMBC adduct was further interrogated using LC-MS. An equivolume mixture of 10 μM $TNB^{2-}$ standard and 20 μM MMBC solution, both prepared in 20 mM sodium phosphate, pH 7.4 was incubated in the dark at r.t. for 30 minutes. The reaction was quenched via acidification with 10% formic acid to a final concentration of 1% formic acid prior to injection onto a Poroshell 120 EC-C18 reversed phase column that was pre-equilibrated with 10% solvent B (mobile phase A: 0.1% formic acid in water; mobile phase B: 0.1% formic acid in acetonitrile). After holding initial conditions for 2 minutes, the starting reagents and reaction products were separated using a gradient from 10 to 60% solvent B over 5 minutes. The LC eluent was coupled to a fluorescence detector as well as to a Thermo mass spectrometer equipped with an electrospray source (Orbitrap Fusion). Notable mass spectrometer parameters included a spray voltage of 3700 V, ion transfer temperature of 325° C., Orbitrap resolution of 60 K, and a AGC target of 1e5 counts.

Traditional Ellman's Method

Cysteine standards (ranging from 0 to 40 μM) and protein samples (targeting a free thiol concentration of 20 μM) were prepared in either native conditions (111 mM MOPS, 1 mM EDTA, pH 7.25) or denaturing conditions (native conditions+4 M guanidine hydrochloride). Sample protein concentrations were measured using a Nanodrop—blanking the spectrophotometer with a matched matrix—and the corresponding protein's extinction coefficient. Samples and standards were then incubated with 0.58 mM DTNB in the dark at r.t. for 60 minutes. One hundred microliters of each sample and standard were transferred in triplicates to a Corning 96-well half volume clear-bottom plate. Absorbance readings at 412 nm were taken on a Spectramax i3 plate reader. The thiol concentrations in each protein sample was determined by referencing its absorbance readings against the calibration curve (linear) derived using the cysteine standards. The free thiol content, on a mole per mole basis, could be calculated by dividing the sample thiol concentrations by the sample protein concentrations determined via Nanodrop. During this procedure, multi-channel pipetting was used wherever possible.

Fluorescent Ellman Method

Cysteine standards (ranging from 0 to 10 μM) and protein samples (targeting a free thiol concentration of 5 μM) were prepared in either native conditions (111 mM MOPS, 1 mM EDTA, pH 7.25) or denaturing conditions (native conditions+4 M guanidine hydrochloride). Protein concentrations were measured using a Nanodrop—blanking the spectrophotometer with a matched matrix—along with the corresponding protein's extinction coefficient. Samples and standards were then incubated with 0.58 mM DTNB in the dark at r.t. for 60 minutes. Fifty microliters of each sample and standard were transferred in triplicates to a Corning NBS 96-well half-volume black plate, where the destination wells contained 50 μL of 20 μM MMBC solution. Mixing was achieved via plunging of the pipette. Fluorescence readings (ex: 375 nm, em: 510 nm) were taken on a Spectramax i3 plate reader. The thiol concentrations in each protein sample was determined by referencing its fluorescence readings against the calibration curve (linear) derived using the cysteine standards. The free thiol content, on a mole per mole basis, could be calculated by dividing the sample thiol concentrations by the sample protein concentrations determined via Nanodrop 2000. During this procedure, multi-channel pipetting was used wherever possible.

Assessment of Method Properties

Quantitation and detection limits were determined by using the F. Ellman method to generate a calibration curve (0-10 μM cysteine) and to measure 8 replicates (individual sample preparations) of the 0 μM cysteine standards i.e. blanks. For comparison, the Traditional Ellman method was used to generate a calibration curve (0-40 μM cysteine) and to measure 8 replicates of the 0 μM cysteine standards. The limits of detection (LOD) and quantitation (LOQ) were calculated for either F. Ellman or Traditional Ellman methods using the following mathematical relationship:

$$LOD = 3.3 \times \frac{\sigma_b}{m}$$

$$LOQ = 10 \times \frac{\sigma_b}{m}$$

Where $\sigma_b$ is the standard deviation of the 8 blank measurements and m is the slope of the cysteine calibration curve.

The F. Ellman method sensitivity to different thiol substrates was evaluated next. Using either cysteine, N-acetyl cysteine, or glutathione as the thiol substrate, calibration curves ranging from 0-10 μM were generated using the F. Ellman method. This experiment was performed both under native and denaturing conditions.

In order to assess method accuracy, free thiol content on 11 molecules—including 7 IgG1 antibodies, 2 IgG4 antibodies, 1 bispecific antibody, and 1 antibody Fab fragment—was determined using the F. Ellman method under denaturing conditions. The F. Ellman results were compared to free thiol values for the same 11 molecules determined using a NcHM-tagged reversed phase liquid chromatography assay, a previously described (Wei, B et al. Development of a Rapid Reversed-Phase Liquid Chromatographic Method for Total Free Thiol Quantitation in Protein Therapeutics. J. Pharm. Biomed. Anal. 2020, No. June, 113434). The latter assay was chosen as an appropriate comparator because it relies on a free thiol detection mechanism that is orthogonal to the F. Ellman method (i.e. derivatization of free thiols using NcHM, followed by reversed-phase separation with enhanced selectivity due to NcHM hydrophobicity, and UV absorption peak detection). Intermediate precision of F. Ellman on an abbreviated sample panel (7 out of 11 molecules) was determined by two different analysts, on different days, using different reagents.

Buffering Capacity of Phosphate Buffer Compared with MOPS Buffer in the Presence of 4 M Guanidine Hydrochloride One mL aliquots of denaturing MOPS buffer (100 mM MOPS, 4M guanidine hydrochloride, 1 mM EDTA, pH 7.4) and denaturing phosphate buffer (100 mM sodium phosphate, 4M guanidine hydrochloride, 1 mM EDTA, pH 7.4) were each acid titrated with 1 N hydrochloric acid (10 μL at a time, up to 40 μL). Separate 1 mL aliquots of the same MOPS buffer and phosphate buffer were each base titrated with 1 N sodium hydroxide (10 μL at a time, up to 40 μL). pH measurements were taken after each acid/base titrant addition using a micro pH meter.

Example 2: Fluorescent Ellman Assay

Results

In the present disclosure an augmentation to the Ellman's method is described, referred to as the F. Ellman assay. Adding an incubation step with a fluorogenic probe, e.g. methyl maleimidobenzochromenecarboxylate (MMBC), or fluorescent probe at the end of the Ellman's method effectively transduces the UV absorption signal into a fluorescent signal, and improves the quantitation limits of the Ellman's method by approximately 4-fold, even with a 2-fold dilution due to MMBC addition. The accuracy and general usefulness of the F. Ellman assay is shown in its applications to various low molecular weight thiol substrates (i.e., cysteine, N-acetylated cysteine, glutathione) as well as several complex high molecular weight thiol substrates such as monoclonal antibodies.

An exemplary 2-step reaction schematic of the assay is shown in FIG. 1. In the first step (FIG. 1, step I), free thiols in a sample are exchanged with DTNB to stoichiometrically yield $TNB^{2-}$, as in Traditional Ellman's. In the second step (FIG. 1, step II), a thiol-specific fluorogenic probe is introduced that reacts with $TNB^{2-}$ to yield a fluorescent signal—either by forming a fluorescent TNB-probe adduct (FIG. 1, step IIA) or by releasing a deprotected fluorescent probe (FIG. 1, step IIB). To develop a viable F. Ellman assay, commercially available thiol-specific fluorogenic probes were screened. The feasibility of the F. Ellman approach was demonstrated, the boost in sensitivity obtained by transducing a UV absorption signal into a fluorescent signal was assessed, and the method's usefulness by determining free thiol content in complex therapeutic antibody samples was evaluated.

Figure 9:
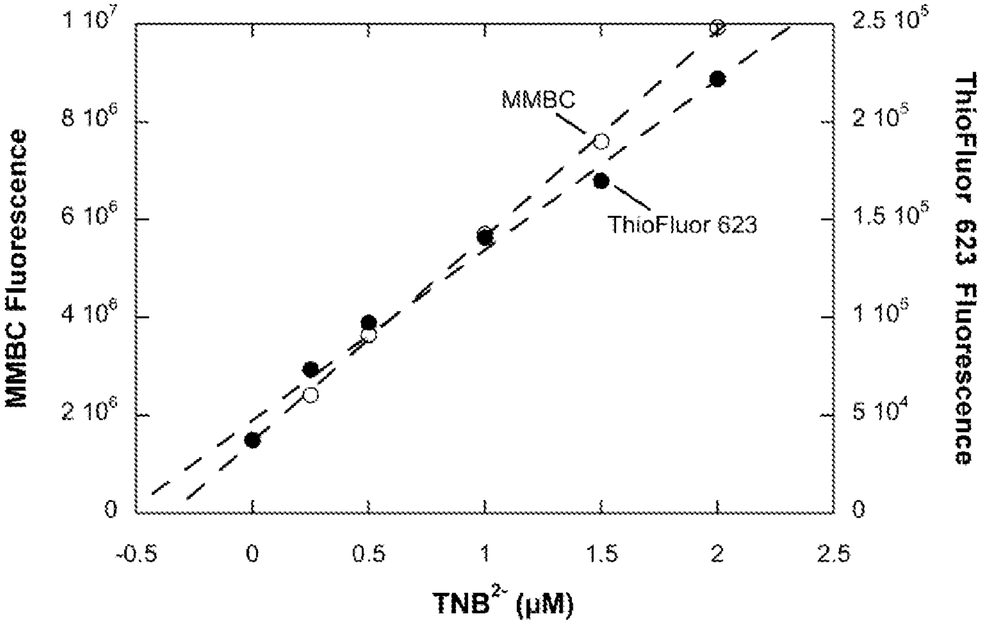
FIG. 9 depicts sensitivity of MMBC (open circles, left y-axis) versus ThioFluor 623 (closed circles, right y-axis) upon reacting with $TNB^{2-}$ for 30 minutes. Note the magnitude of the resulting MMBC fluorescence is approximately 40× greater than the resulting ThioFluor 623 fluorescence.

Seven commercially-available thiol-specific fluorescent/fluorogenic probes were tested with $TNB^{2-}$ to establish the feasibility of the F. Ellman assay. Five of the probes failed to produce any dose-dependent fluorescence. Two fluorogenic probes (ThioFluor 623 and MMBC) successfully produced dose-dependent fluorescence to $TNB^{2-}$, demonstrating proof of concept (FIG. 9). Out of the two, MMBC (also known as ThioGlo-1) produced ~40× more signal and was the probe chosen for further development.

Figure 2:
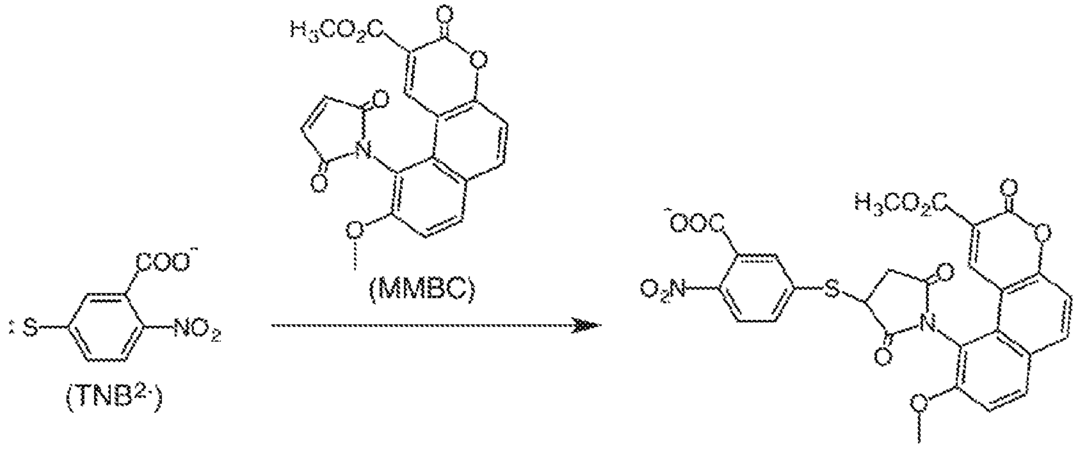
FIG. 2 depicts a reaction schematic of $TNB^{2-}$ and MMBC to yield a fluorescent TNB-MMBC adduct (exact mass: 578.0637 Da, expected structure on far right), following the pathway shown in FIG. 1 (IIA).
Figure 4A:
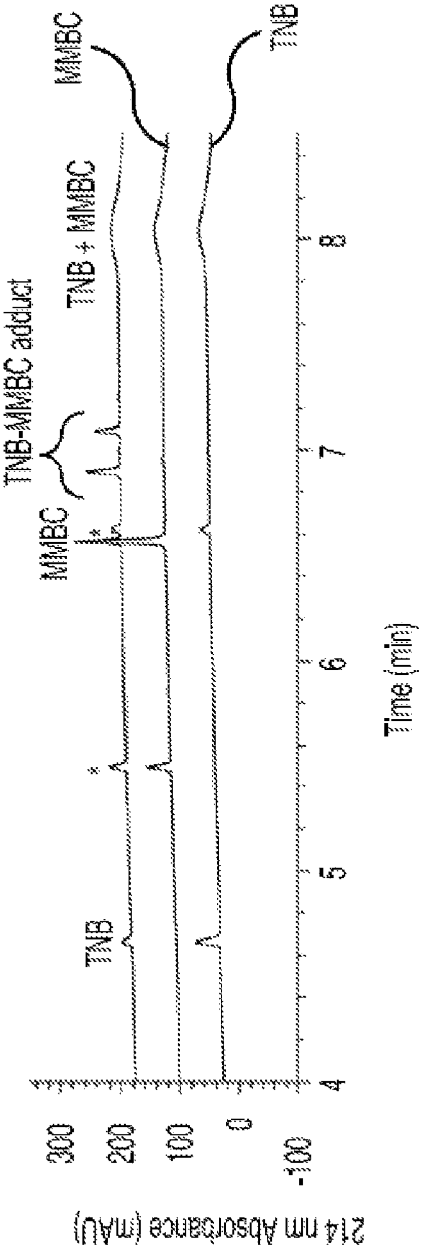
FIGS. 4A-4C depicts reversed phase chromatogram and mass spectrometry analysis of starting reagents (TNB, MMBC) and the TNB-MMBC adduct.
Figure 4B:
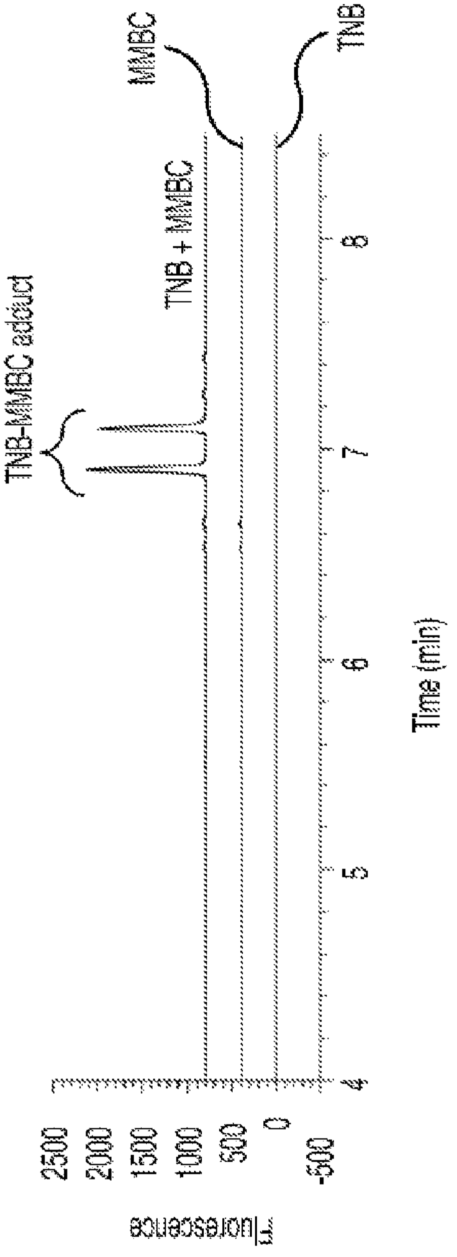
Figure 4C:
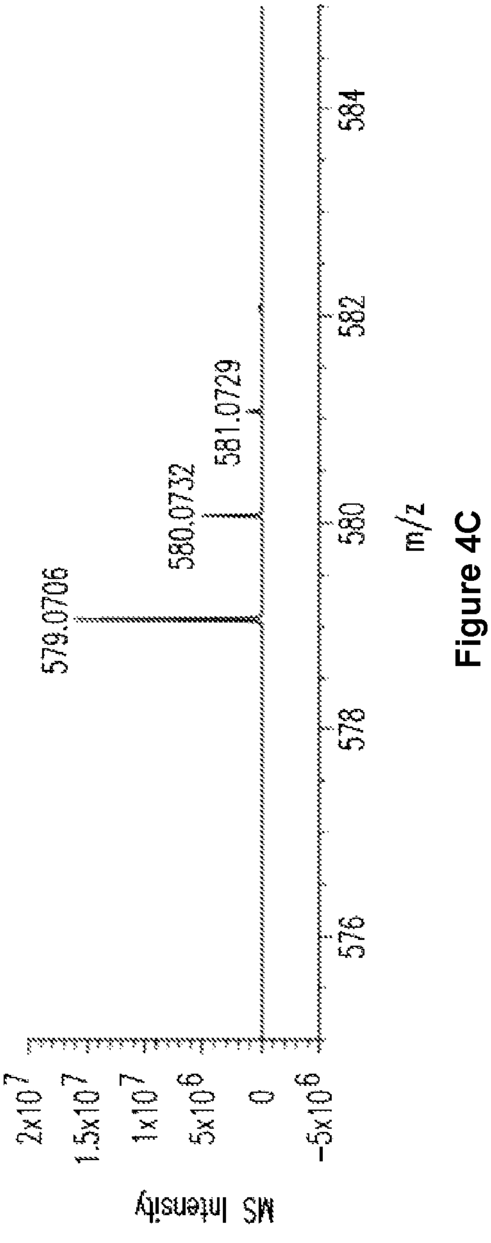
Figure 4D:
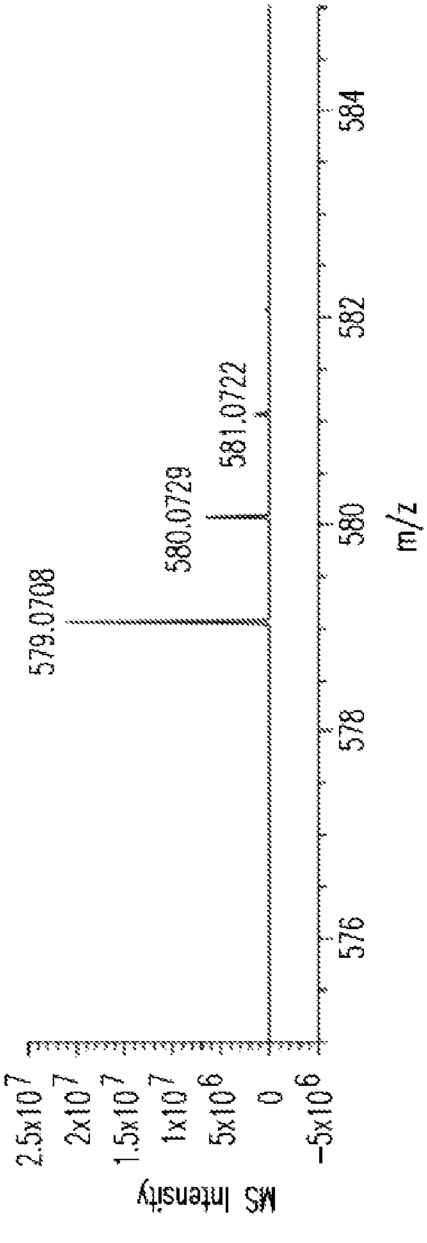

The reaction between $TNB^{2-}$ and MMBC yields a product that fluoresces at the excitation and emission pair of 375 nm/510 nm (FIGS. 3A-3B). FIG. 2 shows the likely reaction product based on nucleophilic attack by a thiol ($TNB^{2-}$) on a maleimide (MMBC). Reversed-phase liquid chromatography coupled with fluorescence detection and mass spectrometry was used to monitor the reaction and confirm this reaction product. Neither the $TNB^{2-}$ nor the MMBC starting materials have appreciable fluorescence but combining $TNB^{2-}$ and MMBC yields two strong fluorescent chromatographic peaks via reversed-phase separation (FIG. 4B). The mass corresponding to both fluorescence peaks is the same, linking the two peaks as isomers, and that mass (579.0706 m/z, $MH^+$, FIG. 4C) is consistent with the proposed TNB-MMBC adduct to within 1 ppm of the theoretical mass (579.0710 m/z, $MH^+$). The later retention times of the fluorescence peaks are also consistent with a TNB-MMBC adduct, which is likely more hydrophobic than either $TNB^{2-}$ or MMBC starting materials.

Figure 5:
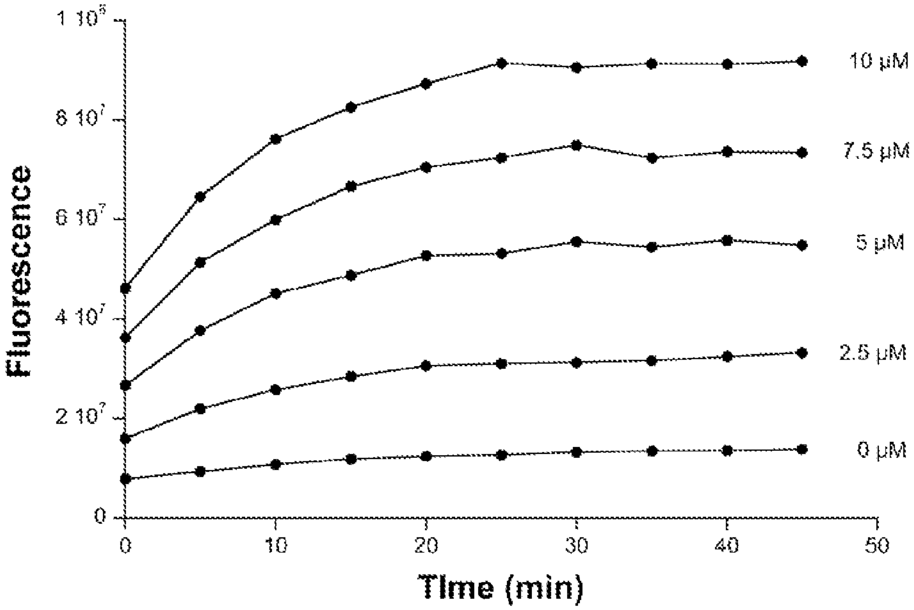
FIG. 5 depicts fluorescence over time (MMBC reagent was introduced at time 0) of cysteine standards using the F. Ellman assay.
Figure 6A:
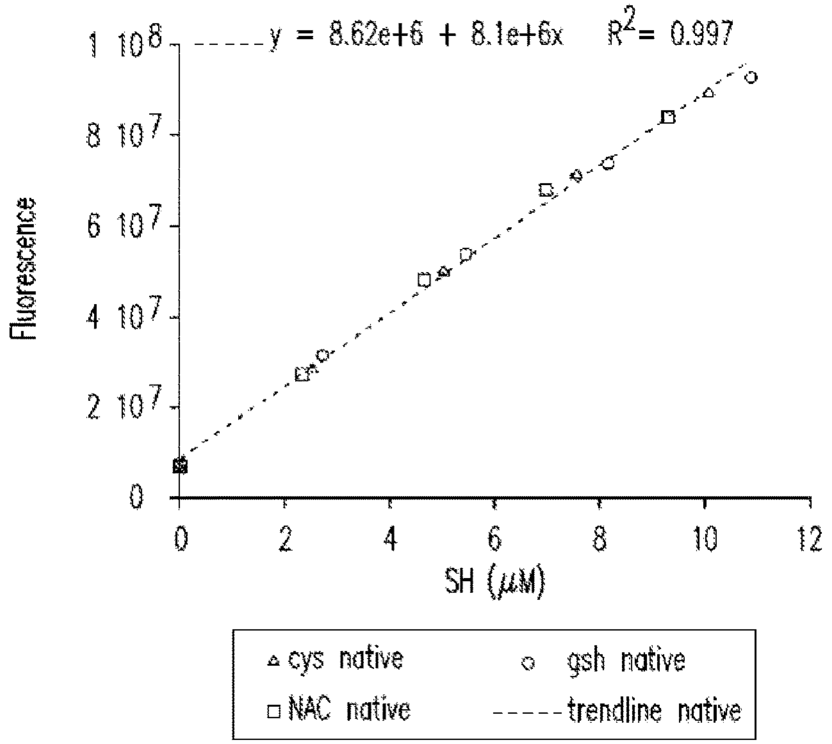
FIGS. 6A-6B depicts F. Ellman calibration curves using cysteine (cys), N-acetylated cysteine (NAC), and glutathione (gsh).
Figure 6B:
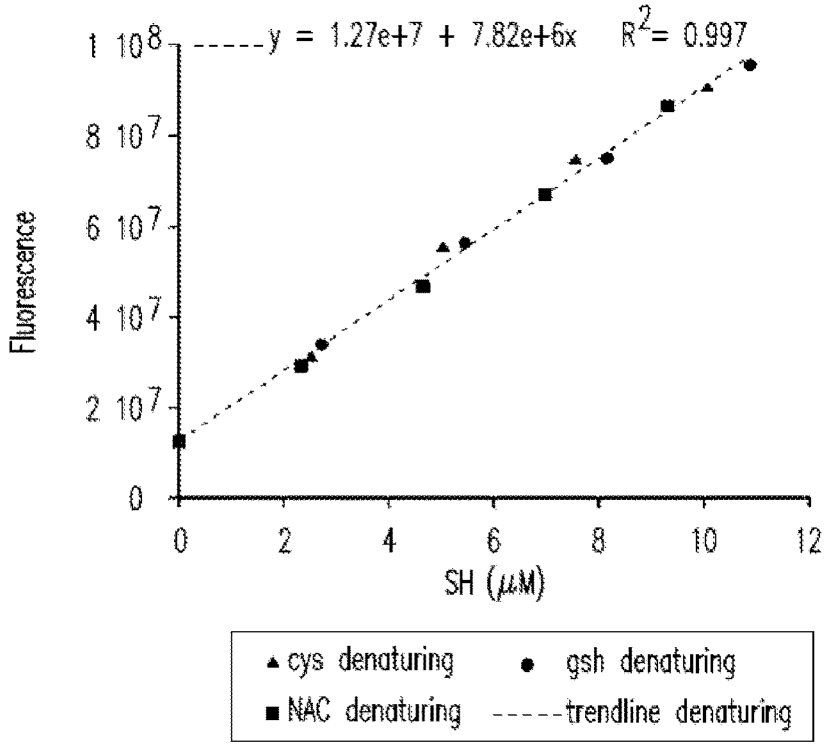

FIG. 5 shows the fluorescent emission over time (during step II in FIG. 1) when applying the F. Ellman assay to a set of cysteine standards. The F. Ellman assay gives a dose-dependent fluorescent signal in response to a thiol substrate, and fluorescence readings begin to plateau 30 minutes after the introduction of MMBC as the reaction is completed at this point. By choosing the 30 minute timepoint as the endpoint reading, a linear calibration curve relating cysteine concentration to fluorescence was constructed (FIGS. 6A-6B). The slope of this calibration curve together with the variation in blank measurement (i.e. noise) yield a limit of quantitation (LOQ) of 0.4 μM cysteine, a 4-fold improvement compared to the LOQ (1.6 μM of cysteine) for Traditional Ellman method in our hands (Table 2).

TABLE 2

Limits of detection and quantitation for F. Ellman's vs. Traditional Ellman's

| | Fluorescent Ellman's | Traditional Ellman's |
|---|---|---|
| LOD (μM SH) | 0.14 | 0.55 |
| LOQ (μM SH) | 0.42 | 1.67 |

As shown in FIGS. 6A-6B, comparable calibration curves can be generated with the F. Ellman assay using other thiol substrates i.e. glutathione and N-acetylated cysteine. Fluorescence readings plateau 30 minutes after the introduction of MMBC for these other thiol substrates as well, which indicates that the thiol exchange reaction with DTNB (step II in FIG. 1) is complete and that MMBC is reacting with $TNB^{2-}$ in all cases. Given the similar sensitivity of the F. Ellman assay to different thiol substrates and the proposed mechanism of the F. Ellman assay, the F. Ellman assay LOQ of 0.4 μM can be generalized to all thiols, irrespective of the nature of substrate, assuming the assay is performed as described. Additionally, the F. Ellman assay performs similarly under both native as well as denaturing conditions (FIGS. 6A-6B). In samples that exhibit tertiary structure such as protein samples, the F. Ellman assay can be used to selectively interrogate free thiols that are solvent-accessible in the natively-folded substrate or to interrogate total free thiols (buried+solvent-accessible).

Figure 7:
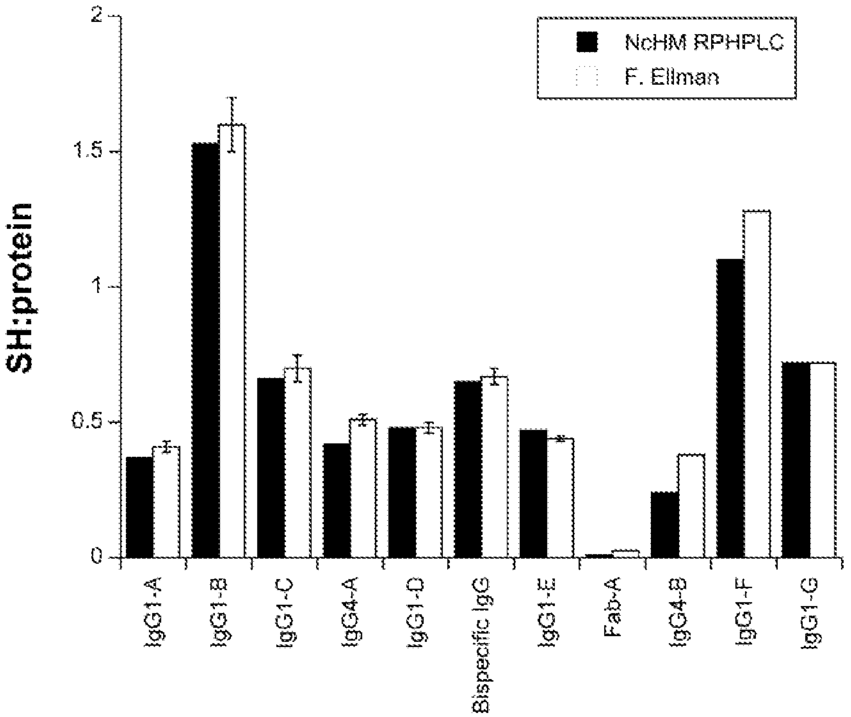
FIG. 7 depicts bridging dataset between F. Ellman (denaturing) and the NcHM-tagging RPLC assay, an orthogonal method for total free thiol quantitation of antibodies. Intermediate precision for the F. Ellman was determined using the first seven molecules (IgG1-A/B/C/D/E, IgG4-A, bispecific IgG) with the error bars representing one standard deviation. F. Ellman coefficient of variation was <8% for each molecule subjected to intermediate precision.

The assay accuracy and precision of the F. Ellman assay was assessed using a panel of antibody-based proteins (under denaturing conditions) and their total (buried+solvent accessible) free thiols on a mole per mole basis are shown in FIG. 7. The fluorescence readings for these protein samples also plateaued 30 minutes after introduction of the MMBC probe. Intermediate precision of the F. Ellman assay was demonstrated using an abbreviated panel (7 out of 11 proteins) and the coefficients of variation were all <8% (FIG. 7). The full panel of proteins were interrogated using an orthogonal NcHM-tagged reverse-phase chromatography assay, and the total free thiol values were consistent with the F. Ellman assay results (FIG. 7), suggesting comparable measurement accuracy of these two methods despite the significant difference in their detection modes.

Similar to the Traditional Ellman, the F. Ellman assay is capable of determining free thiol content of chromatographically-challenging molecules (Table 3), which can include ADCs and IgG2 molecules. ADCs have conjugated hydrophobic drugs that often preclude reverse-phase separation due to significant non-specific interactions, while IgG2s contain disulfide bond isoforms that lead to multiple peaks on reverse-phase separation and complicate analysis. Both types of samples are amenable for analysis by the F. Ellman assay but not by NcHM-tagged reverse-phase chromatography assay. Table 3 shows free thiol values of chromatographically-challenging molecules using a denaturing F. Ellman assay. Chromatographically-challenging molecules can include antibody-drug conjugates (ADC)—which contain conjugated hydrophobic drugs that often preclude reverse-phase separation due to non-specific interactions—and IgG2 molecules—which contain disulfide bond isoforms that lead to multiple peaks on reverse-phase separation and complicate analysis.

TABLE 3

| Molecule | SH:Protein |
|---|---|
| ADC-A | 0.39 |
| ADC-B | 0.29 |
| IgG2-A | 0.61 |

Discussion

While the F. Ellman assay is a conceptually simple augmentation of the Traditional Ellman method, it was entirely unpredictable whether it could be practicably implemented given the properties of $TNB^{2-}$. The electron withdrawing functional groups and electron delocalization—which give DTNB its uncharacteristically low bond dissociation energy (Oae, S. Organic Sulfur Chemistry: Structure and Mechanism, 1st Ed.; Doi, J., Ed.; CRC press: Boca Raton, FL, 1992) and make it so successful as a thiol exchanging agent—also render $TNB^{2-}$ a poor nucleophile. Furthermore, the electron withdrawing functional groups and electron delocalization of $TNB^{2-}$ could potentially quench the fluorescence of the conjugated TNB-fluorogenic probe through various mechanisms including photoinduced electron transfer, internal charge transfer, etc. (Chen, X et al., Chem. Soc. Rev. 2010, 39 (6), 2120-2135; Escudero, D. Acc. Chem. Res. 2016, 49 (9), 1816-1824; Daly, B. et al., Chem. Soc. Rev. 2015, 44 (13), 4203-4211). Therefore, it was not surprising that five of the seven probes tested failed to produce a suitable dose-dependent response to $TNB^{2-}$. The results outlined in herein, however, showed that $TNB^{2-}$ can be converted into a fluorescent signal with the help of the fluorogenic probes ThioFluor 623 or MMBC (FIG. 9).

Figure 8:
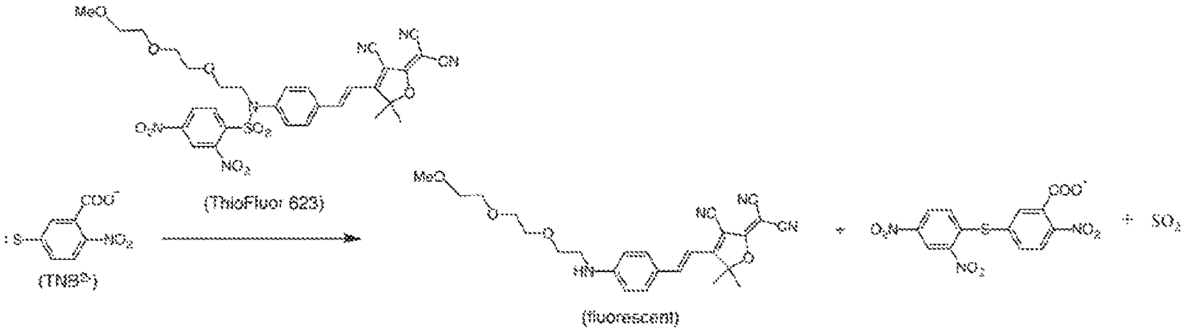
FIG. 8 depicts a reaction schematic of $TNB^{2-}$ and ThioFluor 623 to yield a deprotected fluorescent ThioFluor 623, following the pathway shown in FIG. 1 (IIB).

ThioFluor 623 is a fluorogenic compound with a 2,4-dinitrobenzene sulfonamide (DNBS) functional group and its fluorescence is contingent upon the release of this DNBS group by a thiol substrate (FIG. 8). The deprotected ThioFluor 623 fluoresces modestly with a quantum yield of 0.01 in aqueous media (Bouffard, J. et al., Org. Lett. 2008, 10 (1), 37-40). Alternative DNBS-containing fluorogenic probes that selectively react with thiophenols are known and can be used in the instant strategy that have significantly better quantum yields than ThioFluor 623 (Wang, Z. et al., Anal. Chem. 2012, 84 (11), 4915-4920; Jiang, W. et al., Angew. Chemie-Int. Ed. 2007, 46 (44), 8445-8448; Lin, W. et al.; Long, L.; Tan, W. A Highly Sensitive Fluorescent Probe for Detection of Benzenethiols in Environmental Samples and Living Cells W. 2010, 1503-1505). MMBC is a fluorogenic compound with a maleimide functional group and its fluorescence is contingent upon nucleophilic attack by a thiol substrate on this maleimide (FIG. 1A). Upon reacting with cysteine, MMBC fluoresces intensely with a quantum yield of 0.65 (Yang, J.-R et al., Journal of Heterocyclic Chemistry. 1991, pp 1177-1180).

We determined the LOQs of F. Ellman and Traditional Ellman assays to be 0.4 μM and 1.6 μM SH, respectively, suggesting that the MMBC augmentation improved the limits of quantitation by ~4 fold (Table 2). This observed performance enhancement can be explained by lower background signals in fluorescence measurement versus UV absorbance measurements, although the magnitude of enhancement appears modest when considering that fluorescence assays typically attain LOQs 3-4 orders of magnitude lower than UV absorbance assays. Further improvements to the F. Ellman assay LOQ were likely limited by background DTNB hydrolysis, which introduces more noise to the fluorescence measurements. Nevertheless, the improved LOQ coupled with the fact that the F. Ellman assay requires half the sample volume translate to needing ~8× less material in making a thiol determination with the F. Ellman assay relative to Traditional Ellman.

It is important to note that our LOQ determination for Traditional Ellman method of 1.6 μM is higher than previously reported LOQs for Traditional Ellman method, which were in the range of 0.6-0.9 μM (Wright, S. K. et al., Anal. Biochem. 1998, 265 (1), 8-14; Riener, C. K. et al., Anal. Bioanal. Chem. 2002, 373 (4-5), 266-276). An important difference in methodology, however, is that we incubated our samples with DTNB for 60 minutes (as opposed to 5 minutes in those previous studies). We deliberately chose a longer incubation time to allow free thiols on proteins to fully react with DTNB (Wright, S. K. et al., Anal. Biochem. 1998, 265 (1), 8-14). But as a result of the longer incubation time, there is also more opportunity for DTNB hydrolysis and background noise, hence the higher LOQ for Traditional Ellman method in our study. Wherever possible, we kept the methodology (i.e. reagents, consumables, instruments, etc.) the same between the F. Ellman assay and Traditional Ellman's methods, in order to fairly compare their method performance within the scope of this study. To our knowledge, the F. Ellman assay's augmentation represents the biggest boost in sensitivity for the Traditional Ellman method since its inception over 60 years ago.

Notably, the F. Ellman assay successfully preserves one of the key advantages of the Traditional Ellman's method over other fluorogenic free thiol assays: the sensitivity of the F. Ellman assay is agnostic to the nature of thiol substrate (FIGS. 6A-6B), assuming that DTNB and the thiol substrate are given sufficient time to react. Consequently, a single, universal calibration curve (with cysteine, for example) can be used in the F. Ellman assay to quantify thiols in a diverse set of samples, regardless of the nature of substrate(s) or the thiol microenvironment(s). This approach is not possible, for example, if we had used MMBC (without DTNB) to directly assay thiol substrates because MMBC exhibits different fluorescence efficiencies when conjugated to different substrates (Hoff, S. et al., Analyst 2013, 138, 2096-2103). In this study, we successfully used a single cysteine calibration curve with the F. Ellman assay to accurately determine thiol content in 7 different IgG1s, a bispecific IgG, an IgG2, 2 IgG4s, 2 antibody-drug conjugates, a Fab fragment, and various small molecules.

There are some limitations to the F. Ellman assay with MMBC. First, the solubility of MMBC is 20 μM in aqueous solutions and limits the upper substrate range of the F. Ellman assay. Second, the F. Ellman assay should be performed with a calibration curve to control for background DTNB hydrolysis and to calibrate the fluorescence response, whereas a calibration curve is not necessary with the Traditional Ellman's if one relies on the extinction coefficient of $TNB^{2-}$ (although this may not be advisable due to known matrix effects on TNB's extinction coefficient at 412 nm (Riddles, P. W. et al., Methods Enzymol. 1983, 91 (1979), 49-60)).

Figure 10:
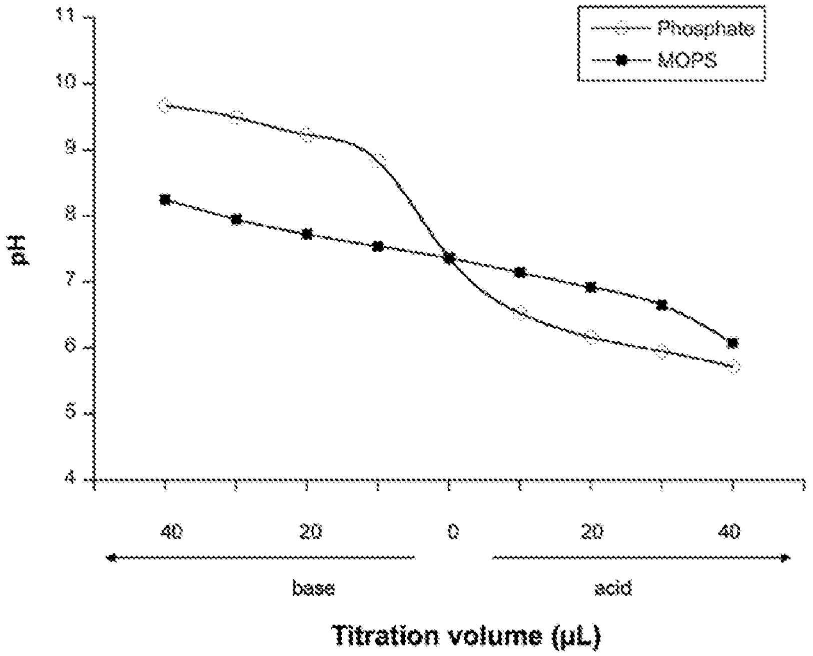
FIG. 10 depicts acid/base titrations comparing buffering capacities of phosphate versus MOPS buffer in the presence of 4M guanidine hydrochloride (phosphate buffer: 100 mM phosphate, 4M guanidine hydrochloride, 1 mM EDTA, pH 7.4; MOPS buffer: 100 mM MOPS, 4M guanidine hydrochloride, 1 mM EDTA, pH 7.4). Acid titration was performed with 1 N HCl and base titration was performed with 1 N NaOH.

Finally, it is worth discussing an important consideration regarding buffer when performing the F. Ellman assay (or Traditional Ellman) under denaturing conditions. Previous reports describe the use of high concentration guanidine hydrochloride in neutral pH phosphate buffers to create a denaturing environment (Robotham, A. C. et al., MAbs 2019, 0 (0), 1-10; Riddles, P. W.; et al., Methods Enzymol. 1983, 91 (1979), 49-60; Aitken, A. et al., In Protein Protocols Handbook, The; Walker, J. M., Ed.; Humana Press: New Jersey, 2002; pp 595-596). However, phosphate under these conditions as a buffer system is a poor choice given the dramatic dependence of phosphate's pKa on ionic strength (Scatchard, G. Chem. Rev. 1936, 19 (3), 309-327; Pitzer, K. S.; Pitzer, K. S. Thermodynamics of Electrolytes. 1972, 3965 (1969), 268-277). In FIG. 10, we compare the buffering capacity of a phosphate buffer and a MOPS buffer in the presence of 4 M guanidine hydrochloride. While the MOPS buffer, a Good's buffer, was able to reasonably buffer against both acid and base perturbations, the phosphate buffer in such a strong electrolyte environment had virtually no buffering capacity at neutral pH. High concentrations of urea, in contrast to guanidine hydrochloride, will not contribute significantly to a solution's ionic strength and therefore should be compatible with neutral pH phosphate buffers. Buffer considerations are easy to overlook and yet an incompatible buffer system will have significant ramifications for the accuracy and precision of the F. Ellman and Traditional Ellman assays.

What is claimed is:

1. A method for detecting a free thiol, the method comprising:

a) contacting a thiol substrate with 5,5'-dithiobis-(2-nitrobenzoic acid) (DTNB) to stoichiometrically liberate $TNB^{2-}$ b) contacting the liberated $TNB^{2-}$ with a reagent that interacts with the liberated $TNB^{2}$– to produce a fluorescent signal;

c) detecting the fluorescent signal emitted by the interaction of the liberated $TNB^{2}$– with the reagent to thereby detect the free thiol; and wherein the reagent is a fluorogenic probe or a fluorescent probe.

2. The method of 1, wherein incubating the $TNB^{2-}$ molecules with the fluorogenic probe or the fluorescent probe results in formation of:

a) a fluorescent TNB-probe adduct; or b) a deprotected fluorescent probe and a non-fluorescent TNB adduct.

3. The method of claim 2, wherein the fluorescent signal is emitted by:
a) the fluorescent TNB-probe adduct; or
b) the deprotected fluorescent probe.
4. The method of claim 2, wherein the fluorogenic probe or the fluorescent probe is a thiol-specific probe.
5. The method of claim 4, wherein the thiol-specific probe contains:
a) a maleimide functional group; or
b) a 2,4-dinitrobenzene sulfonamide (DNBS) function group.
6. The method of claim 4, wherein the fluorogenic probe:
a) is methyl maleimidobenzochromene-carboxylate (MMBC); or
b) is ThioFluor 623.
7. The method of claim 1, wherein the thiol;
a) is present on a low molecular weight thiol substrate; or
b) is present on a high molecular weight thiol substrate.
8. The method of claim 7, wherein the high molecular weight thiol substrate is a polypeptide, an antibody, or an antibody-drug-conjugate (ADC).
9. The method of claim 8, wherein the antibody is:
a) an IgG2;
b) one half of a bispecific antibody; or
c) a bispecific antibody.
10. A method of quantifying the free thiol content of a thiol substrate, the method comprising:
a) contacting the thiol substrate with 5,5'-dithiobis-(2-nitrobenzoic acid) (DTNB) to stoichiometrically liberate TNB2−;
b) incubating the TNB2− with a reagent that interacts with the liberated TNB2− to produce a fluorescent signal;
c) detecting a fluorescent signal emitted by the interaction of the liberated TNB2− with the reagent; and
d) quantifying the free thiol content of the molecule by comparing the signal detected in c) with a reference signal of known quantity; and
wherein the reagent is a fluorogenic probe or a fluorescent probe.

11. The method of 10, wherein incubation of $TNB^{2-}$ molecules with the fluorogenic probe or the fluorescent probe results in formation of:
a) a fluorescent TNB-probe adduct; or
b) a deprotected fluorescent probe and a non-fluorescent TNB adduct.
12. The method of claim 10, wherein the thiol;
a) is present on a low molecular weight thiol substrate; or
b) is present on a high molecular weight thiol substrate.
13. The method of claim 12, wherein the high molecular weight thiol substrate is a polypeptide, an antibody, or an antibody-drug-conjugate (ADC).
14. The method of claim 13, wherein the antibody is:
a) an IgG2;
b) one half of a bispecific antibody; or
c) a bispecific antibody.
15. The method of claim 11, wherein the fluorescent signal is emitted by:
a) the fluorescent TNB-probe adduct; or
b) the deprotected fluorescent probe.
16. The method of claim 11, wherein the fluorogenic probe or the fluorescent probe is a thiol-specific probe.
17. The method of claim 16, wherein the thiol-specific probe contains:
a) a maleimide functional group; or
b) a 2,4-dinitrobenzene sulfonamide (DNBS) function group.
18. The method of claim 16, wherein the fluorogenic probe is:
a) methyl maleimidobenzochromene-carboxylate (MMBC); or
b) ThioFluor 623.
19. The method of claim 10, wherein the free thiol content is calculated by comparing the fluorescence signal against a calibration curve to determine the thiol concentration and dividing the thiol concentration by the concentration of the thiol substrate.
20. A kit for detecting a thiol compound, comprising:
a) 5,5'-dithiobis-(2-nitrobenzoic acid) (DTNB); and
b) a fluorogenic probe or a fluorescent probe.

* * * * *